United States Patent
Wang et al.

(10) Patent No.: US 10,013,675 B2
(45) Date of Patent: Jul. 3, 2018

(54) METHOD AND DEVICE FOR REMINDING USER

(71) Applicant: Xiaomi Inc., Beijing (CN)

(72) Inventors: Bin Wang, Beijing (CN); Zhiguang Zheng, Beijing (CN); Dongfang Ji, Beijing (CN); Qiliang Chen, Beijing (CN); Jinliang Ou, Beijing (CN)

(73) Assignee: Xiaomi Inc., Beijing (CN)

( * ) Notice: Subject to any disclaimer, the term of this patent is extended or adjusted under 35 U.S.C. 154(b) by 157 days.

(21) Appl. No.: 14/582,440

(22) Filed: Dec. 24, 2014

(65) Prior Publication Data

US 2015/0302724 A1 Oct. 22, 2015

Related U.S. Application Data

(63) Continuation of application No. PCT/CN2014/084462, filed on Aug. 15, 2014.

(30) Foreign Application Priority Data

Apr. 17, 2014 (CN) .......................... 2014 1 0155540

(51) Int. Cl.
*G08B 13/14* (2006.01)
*G06Q 10/10* (2012.01)
(Continued)

(52) U.S. Cl.
CPC ........ *G06Q 10/109* (2013.01); *H04M 1/7253* (2013.01); *H04M 1/72566* (2013.01);
(Continued)

(58) Field of Classification Search
CPC ........... H04M 1/7253; H04M 1/72566; H04M 1/72569; H04M 1/72572; H04M 1/72577;
(Continued)

(56) References Cited

U.S. PATENT DOCUMENTS 6,748,195 B1 * 6/2004 Phillips ............. H04M 1/72569
370/338
7,359,714 B2 * 4/2008 Parupudi ........... H04M 1/72563
455/414.1
(Continued)

FOREIGN PATENT DOCUMENTS

CN 1652559 A 8/2005
CN 101567923 A 10/2009
(Continued)

OTHER PUBLICATIONS

International Search Report of PCT International Application No. PCT/CN2014/084462, from the State Intellectual Property Office of China, dated Feb. 4, 2015.
(Continued)

*Primary Examiner* — Firmin Backer
*Assistant Examiner* — Adnan Aziz
(74) *Attorney, Agent, or Firm* — Finnegan, Henderson, Farabow, Garrett & Dunner LLP (57) ABSTRACT

The present disclosure provides a method and a device for reminding a user. The method includes: detecting whether a preset number of terminals in an area have performed a designated operation within a preset time period; inquiring a terminal in the area that has not performed the designated operation if it is detected that the preset number of terminals in the area have performed the designated operation within the preset time period; and sending a reminder to the terminal in the area that has not performed the designated operation, the reminder reminding a user of the terminal to perform the designated operation.

9 Claims, 4 Drawing Sheets

(51) Int. Cl.
*H04M 1/725* (2006.01)
*H04W 4/02* (2018.01)

(52) U.S. Cl.
CPC .... *H04M 1/72569* (2013.01); *H04M 1/72572* (2013.01); *H04W 4/02* (2013.01); *H04W 4/023* (2013.01)

(58) Field of Classification Search
CPC ....... H04W 4/001; H04W 4/008; H04W 4/02; H04W 4/023; H04W 4/043; G06Q 10/109
See application file for complete search history.

(56) References Cited

U.S. PATENT DOCUMENTS

| | | | | |
|---|---|---|---|---|
| 8,478,306 B2 * | 7/2013 | Zheng | H04M 1/72569 | 455/433 |
| 8,626,111 B2 * | 1/2014 | Waddell | H04M 1/72566 | 455/404.1 |
| 9,143,898 B1 * | 9/2015 | Barr | H04W 4/025 | |
| 2003/0207683 A1 * | 11/2003 | Lempio | H04M 1/72572 | 455/422.1 |
| 2004/0203768 A1 * | 10/2004 | Ylitalo | H04M 1/72572 | 455/435.1 |
| 2007/0032225 A1 * | 2/2007 | Konicek | H04M 1/72513 | 455/417 |
| 2007/0190991 A1 * | 8/2007 | Cargille | H04M 19/04 | 455/415 |
| 2008/0005679 A1 * | 1/2008 | Rimas-Ribikauskas | G01C 21/3688 | 715/745 |
| 2008/0214161 A1 * | 9/2008 | Jakl | H04M 1/72572 | 455/414.2 |
| 2009/0088221 A1 * | 4/2009 | Gilbert | H04M 1/72566 | 455/567 |
| 2009/0167542 A1 * | 7/2009 | Culbert | H04M 1/72569 | 340/635 |
| 2009/0170552 A1 * | 7/2009 | Lin | H04M 1/72569 | 455/550.1 |
| 2009/0307616 A1 * | 12/2009 | Nielsen | H04M 1/72566 | 715/764 |
| 2010/0056124 A1 * | 3/2010 | Keating | H04W 4/02 | 455/418 |
| 2010/0105412 A1 | 4/2010 | Won et al. | | |
| 2010/0306138 A1 * | 12/2010 | Hotes | G06Q 30/0206 | 706/12 |
| 2010/0317371 A1 * | 12/2010 | Westerinen | H04M 1/72572 | 455/456.6 |
| 2011/0117902 A1 * | 5/2011 | Chang | H04W 4/02 | 455/418 |
| 2012/0108211 A1 * | 5/2012 | Nakajima | H04M 1/72577 | 455/411 |
| 2012/0157165 A1 | 6/2012 | Kim et al. | | |
| 2012/0322370 A1 * | 12/2012 | Lee | H04W 4/001 | 455/41.1 |
| 2013/0065584 A1 * | 3/2013 | Lyon | H04W 28/06 | 455/434 |
| 2013/0137459 A1 | 5/2013 | Kobayashi et al. | | |
| 2013/0325407 A1 * | 12/2013 | Lee | G06F 17/00 | 702/188 |
| 2015/0011188 A1 * | 1/2015 | Chou | H04W 4/16 | 455/411 |
| 2015/0079962 A1 * | 3/2015 | Baker | H04W 8/18 | 455/418 |
| 2015/0244801 A1 * | 8/2015 | Guo | H04L 67/2842 | 709/204 |

FOREIGN PATENT DOCUMENTS

| | | |
|---|---|---|
| CN | 101707736 A | 5/2010 |
| CN | 101783845 A | 7/2010 |
| CN | 102013145 A | 4/2011 |
| CN | 102158822 A | 8/2011 |
| CN | 102611785 A | 7/2012 |
| CN | 102624986 A | 8/2012 |
| CN | 102647703 A | 8/2012 |
| CN | 102857627 A | 1/2013 |
| CN | 102915607 A | 2/2013 |
| CN | 102957784 A | 3/2013 |
| CN | 103002161 A | 3/2013 |
| CN | 103024164 A | 4/2013 |
| CN | 103051787 A | 4/2013 |
| CN | 103179548 A | 6/2013 |
| CN | 103268106 A | 8/2013 |
| CN | 103327175 A | 9/2013 |
| CN | 103678216 A | 3/2014 |
| CN | 103957514 A | 7/2014 |
| EP | 1 361 766 A2 | 11/2003 |
| GB | 2 426 667 A | 11/2006 |
| JP | 2003-333052 | 11/2003 |
| JP | 2007-151106 A | 6/2007 |
| JP | 2007-174241 A | 7/2007 |
| JP | 2006-515309 A | 5/2008 |
| JP | 2012-502556 A | 1/2012 |
| KR | 10-2011-0065947 | 6/2011 |
| RU | 2370804 C2 | 10/2009 |
| WO | WO 2013/165355 A1 | 11/2013 |

OTHER PUBLICATIONS

Russian Office Action for Application No. 2015129675/08(0455844) dated Oct. 17, 2016.

European Search Report of European Patent Application No. 15164138.8-1954, from the European Patent Office, dated Aug. 18, 2015.

Juan Carlos Augusto, et al., "Ambient Intelligence and Smart Environments: A State of the Art", Jan. 1, 2010, URL: http://eis.sia.mdx.ac.uk/staffpages/juanaugusto/intro_v12.pdf.

English version of International Search Report of Application No. PCT/CN2014/084462, from the State Intellectual Property Office of China, dated Feb. 4, 2015.

Notification to Grant Patent Right dated Jan. 30, 2018, in counterpart Chinese Patent Application No. 201410155540.7 and English translation thereof.

* cited by examiner

METHOD AND DEVICE FOR REMINDING USER

CROSS REFERENCE TO RELATED APPLICATIONS

The present application is a continuation of International Application No. PCT/CN2014/084462, filed Aug. 15, 2014, which is based upon and claims priority to Chinese Patent Application No. 201410155540.7, filed Apr. 17, 2014, the entire content of all of which is incorporated herein by reference.

TECHNICAL FIELD

The present disclosure generally relates to terminal technology and, more particularly, to a method and a device for reminding a user.

BACKGROUND

With a development of technologies relating to terminals, terminal devices such as mobile phones, tablet PCs, and the like have become indispensable products in people's life and work. In many situations in people's daily life, some operations or changes of settings of terminals are required in response to a usage requirement in a certain situation. For example, when entering into a meeting room or a movie theater, since such situation may require silencing the terminal, a terminal user may choose to set an operation profile of the terminal to a silent mode. The terminal user may then set the operation profile of the terminal back to a normal mode when leaving the meeting room or the movie theater.

However, the user may forget to change the operation profile of the terminal in response to the aforementioned situations or forget to change it back to the normal mode after leaving those situations. This leads to failures of timely responses to the situations and/or reduced interactions between the user and the terminal.

SUMMARY

According to a first aspect of the present disclosure, there is provided a method for reminding a user, comprising: detecting whether a preset number of terminals in an area have performed a designated operation within a preset time period; inquiring a terminal in the area that has not performed the designated operation if it is detected that the preset number of terminals in the area have performed the designated operation within the preset time period; and sending a reminder to the terminal in the area that has not performed the designated operation, the reminder reminding a user of the terminal to perform the designated operation.

According to a second aspect of the present disclosure, there is provided a server, comprising: a processor; and a memory for storing instructions executable by the processor, wherein the processor is configured to: detect whether a preset number of terminals in an area have performed a designated operation within a preset time period; inquire a terminal in the area that has not performed the designated operation if it is detected that the preset number of terminals in the area have performed the designated operation within the preset time period; and send a reminder to the terminal in the area that has not performed the designated operation, the reminder reminding a user of the terminal to perform the designated operation.

According to a third aspect of the present disclosure, there is provided a non-transitory computer-readable storage medium having stored therein instructions that, when executed by a processor in a server, cause the server to perform a method for reminding a user, the method comprising: detecting whether a preset number of terminals in an area have performed a designated operation within a preset time period; inquiring a terminal in the area that has not performed the designated operation if it is detected that the preset number of terminals in the area have performed the designated operation within the preset time period; and sending a reminder to the terminal in the area that has not performed the designated operation, the reminder reminding a user of the terminal to perform the designated operation.

It is to be understood that both the foregoing general description and the following detailed description are explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

The term "terminal" used in this disclosure means general electronic equipment. A terminal may be, for example, a smart mobile phone, a table PC, a smart television, an eBook reader, a Moving Picture Experts Group Audio Layer III (MP3) player, a Moving Picture Experts Group Audio Layer IV (MP4) player, a portable computer, a desktop computer, and the like.

Figure 1:
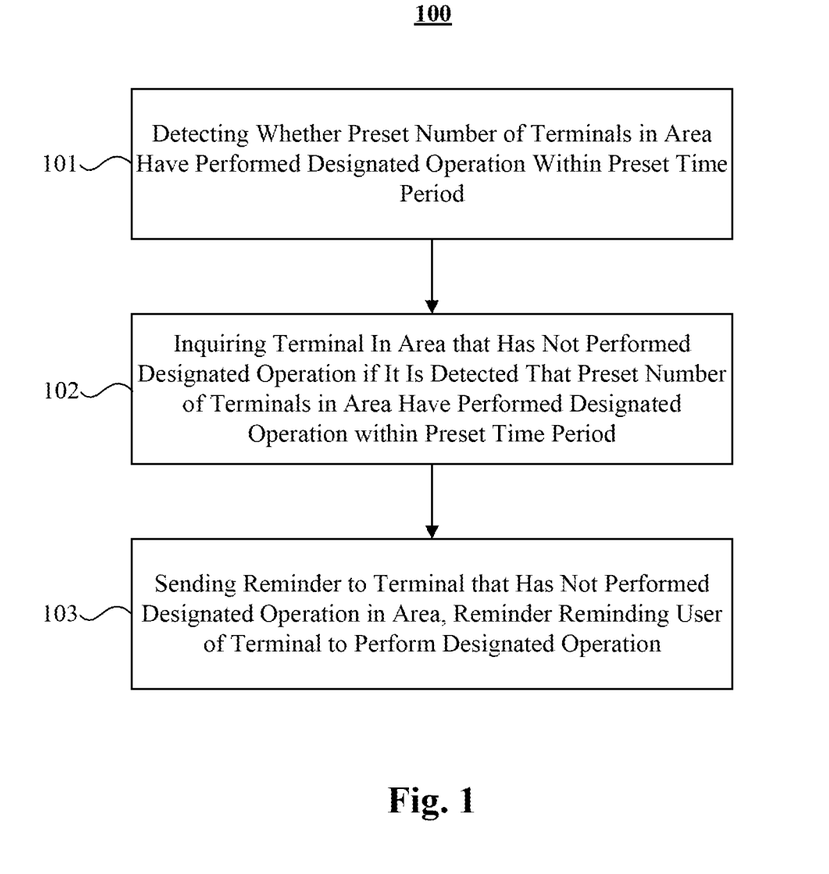
FIG. 1 is a flowchart of a method for reminding a user, according to an exemplary embodiment.

FIG. 1 is a flowchart of a method 100 for reminding a user, according to the first exemplary embodiment. Referring to FIG. 1, the method 100 includes the following steps. In step 101, whether a preset number of terminals in an area have performed a designated operation within a preset time period is detected. In step 102, if it is detected that the preset number of terminals in the area have performed the designated operation within the preset time period, a terminal in the area that has not performed the designated operation is inquired. In step 103, a reminder is sent to the terminal in the area that has not performed the designated operation. The reminder reminds a user of the terminal to perform the designated operation.

By using the method 100 for reminding a user in the above exemplary embodiment, the interaction between the user and the terminal is improved, and unwanted consequences resulted from the user not performing the designated operation are avoided.

Figure 2:
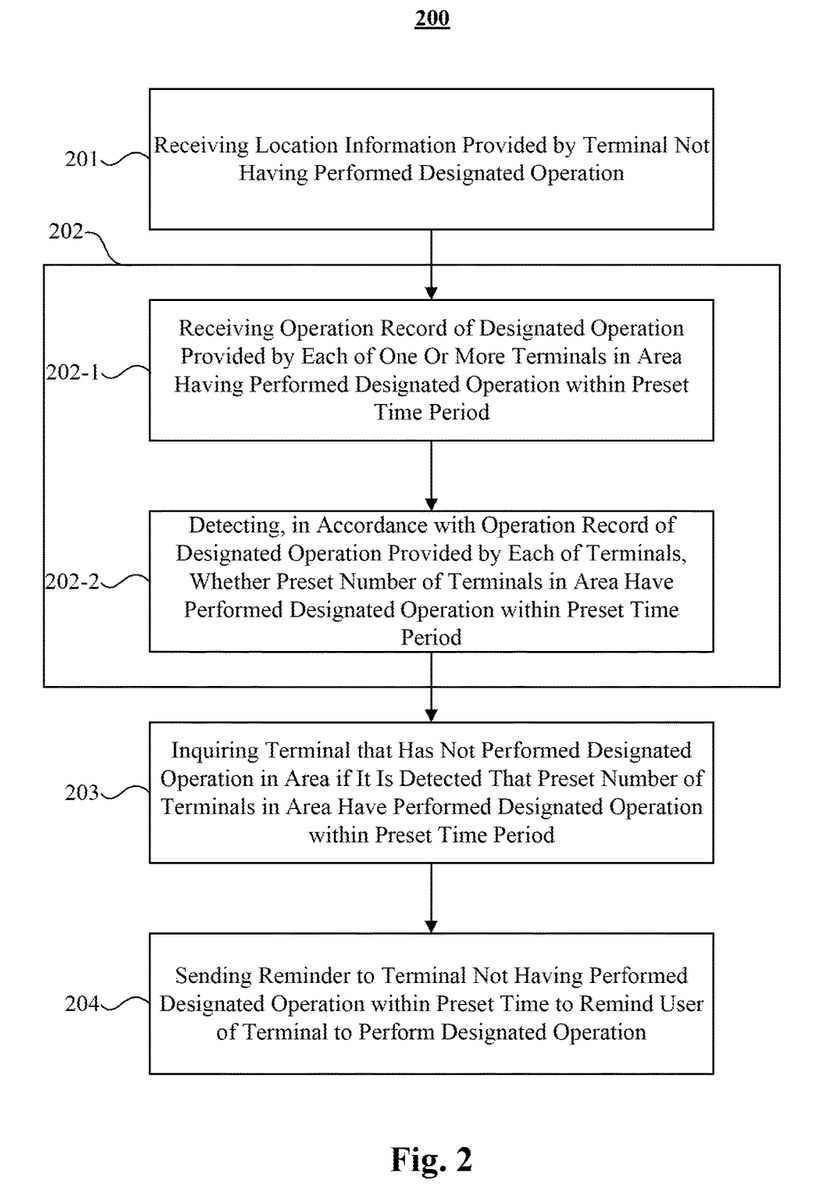
FIG. 2 is a flowchart of a method for reminding a user, according to an exemplary embodiment.

FIG. 2 is a flowchart of a method 200 for reminding a user, according to the second exemplary embodiment. For example, the method 200 may be used in a server. Referring to FIG. 2, the method 200 includes the following steps.

In step 201, location information provided by a terminal not having performed a designated operation is received. The location information provided by the terminal includes, but is not limited to, at least one of an identification of a network accessed by the terminal, an identification of a base station accessed by the terminal, and geographic position information of the terminal.

In exemplary embodiments, an identification of a base station accessed by the terminal may be an identification of a base station accessed by the terminal when the terminal connects to a mobile network, or an identification of a base station accessed by the terminal at a current position. Because a coverage area of a base station is generally fixed, terminals corresponding to the same identification of base station can be determined to be in the same area. Further, because the location of a base station is generally fixed and known, the exact location of the terminal can be determined based on the identification of the base station. Alternatively, an identification of the base station may be an identification of a cell served by the base station. The identification of the base station serving the cell can be obtained from a network provider and based on relevant connection information regarding the terminal accessing the network.

In exemplary embodiments, an identification of a network accessed by the terminal may include, but not limited to, an IP address of the terminal or a WiFi identification used in the accessed network, which is generally reported by the terminal to a server. A network identification can thus be obtained by access information provided by the terminal.

In exemplary embodiments, it can be determined that, if multiple terminals have the same IP address, the multiple terminals are in the same area. Similarly, if multiple terminals have the same WiFi identification used in an accessed network, the multiple terminals can be determined to be in the same area. Although exact locations of the terminals may be unknown, it can be determined that the terminals are in the same area.

In exemplary embodiments, geographic position information of the terminal includes latitude and longitude information obtained by, e.g., a built-in positioning module of the terminal.

In one exemplary embodiment, after initiating an application in the terminal, the built-in positioning module of the terminal may acquire geographic position information of the terminal and report it to a server.

In one exemplary embodiment, the server may determine a position of the terminal based on geographic position information of the terminal. In addition, the server may determine that terminals having the same geographic position information are in the same area.

In step 202, whether a preset number of terminals have performed a designated operation in an area within a preset time period is detected.

In exemplary embodiments, step 202 may include step 202-1 and step 202-2. In step 202-1, an operation record of the designated operation provided by each of one or more terminals in the area having performed the designated operation within the preset time period is received. The operation record includes an operation time of the designated operation, and location information of the terminal corresponding to the operation record.

The designated operation may include, but is not limited to: changing an operation profile; initiating a sound recording; initiating a video recording, and so on. Further, there may be multiple designated operations on a terminal. Designated operations may be distinguished by their categories.

In one exemplary embodiment, an operating system of the terminal monitors operations on the terminal. When a notification message corresponding to the designated operation is detected, it is determined that the terminal has performed the designated operation. At this time, an operation time of the designated operation is recorded, and location information of the terminal is acquired. Subsequently, an operation record of the designated operation is generated and reported to a server.

The location information acquired by the terminal may be at least one of an identification of a network accessed by the terminal, an identification of a base station accessed by the terminal, and geographic position information of the terminal, as described above in step 201. The terminal may determine the identification of the base station based on a mobile network that the terminal is accessing. The terminal may also determine a current IP address or a WiFi identification based on a wireless network that the terminal is accessing. Further, the terminal may obtain current geographic position information by instructing a positioning module to acquire the current geographic position information.

The server receives and saves the operation record provided by each of the terminals. The server may compile statistics of the designated operation based on an operation time and location information in the operation record.

In the step 202-2, in accordance with the operation record of the designated operation provided by each of the terminals, whether the preset number of terminals in the area have performed the designated operation within the preset time period is detected.

A preset time may be set in accordance with a type of a designated operation. For example, when entering into a meeting room with the meeting about to begin, the preset time may be set short such that a reminded user may change a setting of a terminal quickly. Also for example, a user may set a preset time to be less than two minutes.

Determination of whether the terminals are in same area is performed based on the location information described above in connection with step 202-1. Determination of whether the terminals are in same area may include: determining whether the terminals correspond to the same identification of the base station; determining whether the terminals correspond to the same network identification; or determining whether the terminals correspond to the same geographic position information.

In exemplary embodiments, the server periodically screens and compiles statistics of the operation record provided by each of the terminals. For example, the server first determines the terminals that have performed the same designated operation within the preset time, and then identifies the terminals in the same area in accordance with location information of the terminals that have performed the same designated operation. The server further determines whether the number of the terminals that have performed the designated operation in the same area is greater than the preset number.

In step 203, if it is detected that the preset number of terminals in the area have performed the designated operation within the preset time period, a terminal that has not performed the designated operation in the area is inquired.

When it is detected that the preset number of terminals in the same area have performed the designated operation within the preset time period, the terminal in the area not having performed the designated operation is inquired, and a reminder is sent to the terminal not having performed the designated operation. For example, the terminal that does not report an operation record including the designated operation within the preset time period, and has the same position information as that of the detected terminal is inquired.

The manner for judging whether the inquired terminal has the same position information as that of a detected terminal is similar to the above description in connection with step 202-2, e.g., selecting a terminal corresponding to the same identification of the base station; or a terminal corresponding to the same network identification; or a terminal corresponding to the same geographic position information.

In step 204, a reminder is sent to the terminal not having performed the designated operation within the preset time to remind a user of the terminal to perform the designated operation. The reminder may include, but not limited to, a short message, a notification, and the like.

For example, when users A, B, C, and D have a meeting, users A, B, and C set an operation profile of each of their terminals to a silent mode within one minute. However, user D does not perform the same setting (silent mode) on an operation profile of his/her terminal. At this time, a server determines that the terminals of users A, B, C and D are in the same area. The server also determines that the terminals of users A, B and C have set the operation profile to a silent mode within a preset time of two minutes. Further, the server determines that the operation profile of user D's terminal has not been set to the silent mode. Subsequently, the server sends a reminder to user D's terminal. The reminder may read: "Please set the operation profile of the terminal to a silent mode."

In exemplary embodiments, the reminder may further include an instruction for performing the designated operation. After the reminder was sent to user D's terminal as described in the above example, an instruction, such as: "Set the operation profile of the terminal to a silent mode," is provided to user D. User D is then prompted to confirm the instruction. After user D confirms the instruction, the operation profile of user D's terminal is set to a silent mode in accordance with the instruction of the reminder.

In exemplary embodiments, when the reminder includes an instruction for performing a designated operation, upon receiving the reminder, user D's terminal performs an operation in accordance with the instruction of the designated operation, and displays the reminder to user D. For this example, the designated operation is performed directly without user D's input.

By using the method 200 for reminding a user in the above exemplary embodiment, the interaction between the user and the terminal is improved, and the unwanted consequence resulted from the user not performing the designated operation is avoided.

Figure 3:
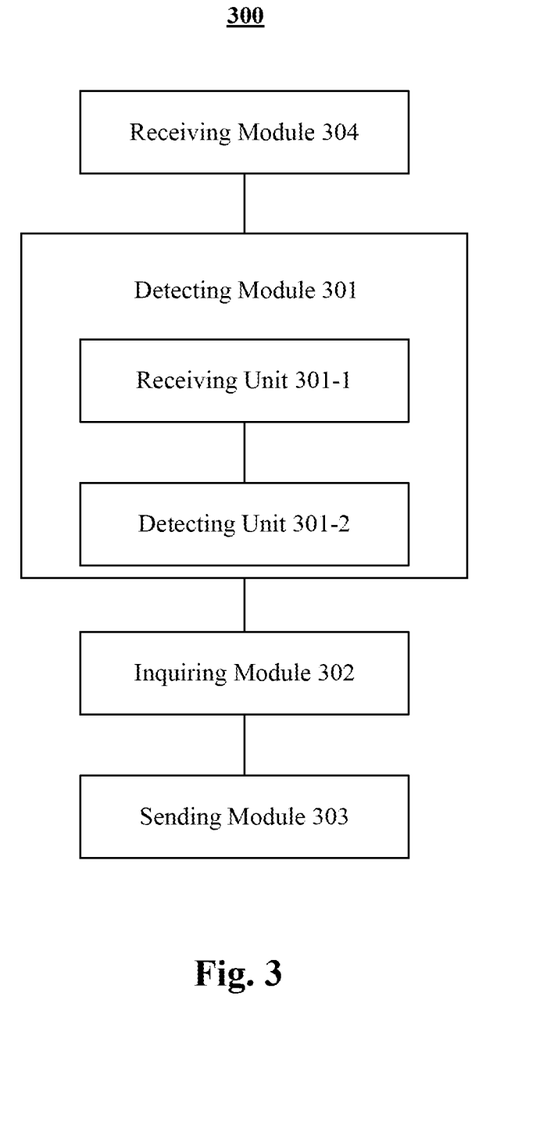
FIG. 3 is a block diagram of a device for reminding a user, according to an exemplary embodiment.

FIG. 3 is a device 300 for reminding a user, according to an exemplary embodiment. Referring to FIG. 3, the device 300 includes: a detecting module 301 configured to detect whether a preset number of terminals in an area have performed a designated operation within a preset time period; an inquiring module 302 configured to inquire a terminal in the area that has not performed the designated operation if it is detected that the preset number of terminals in the area have performed the designated operation within the preset time period; and a sending module 303 configured to send a reminder to the terminal in the area that has not performed the designated operation, the reminder reminding a user of the terminal to perform the designated operation.

The detecting module 301 includes: a receiving unit 301-1 configured to receive an operation record of the designated operation provided by each of the terminals in the area having performed the designated operation within the preset time period, the operation record including a timestamp of the designated operation, and a location information of each of the terminals in the area having performed the designated operation within the preset time period; and a detecting unit 301-2 configured to detect, in accordance with the operation record of the designated operation provided by each of the terminals, whether the preset number of terminals in the area have performed the designated operation within the preset time period.

The inquiring module 302 is configured to inquire the terminal located in the area, and not having reported an operation record of the designated operation within the preset time period.

The device 300 further includes a receiving module 304 configured to receive location information provided by the terminal not having performed the designated operation. The location information includes at least one of an identification of a network accessed by the terminal, an identification of a base station accessed by the terminal, and geographic position information of the terminal.

By using the device 300 for reminding a user in the above exemplary embodiment, the interaction between the user and the terminal is improved, and the unwanted consequence resulted from the user not performing the designated operation is avoided.

Figure 4:
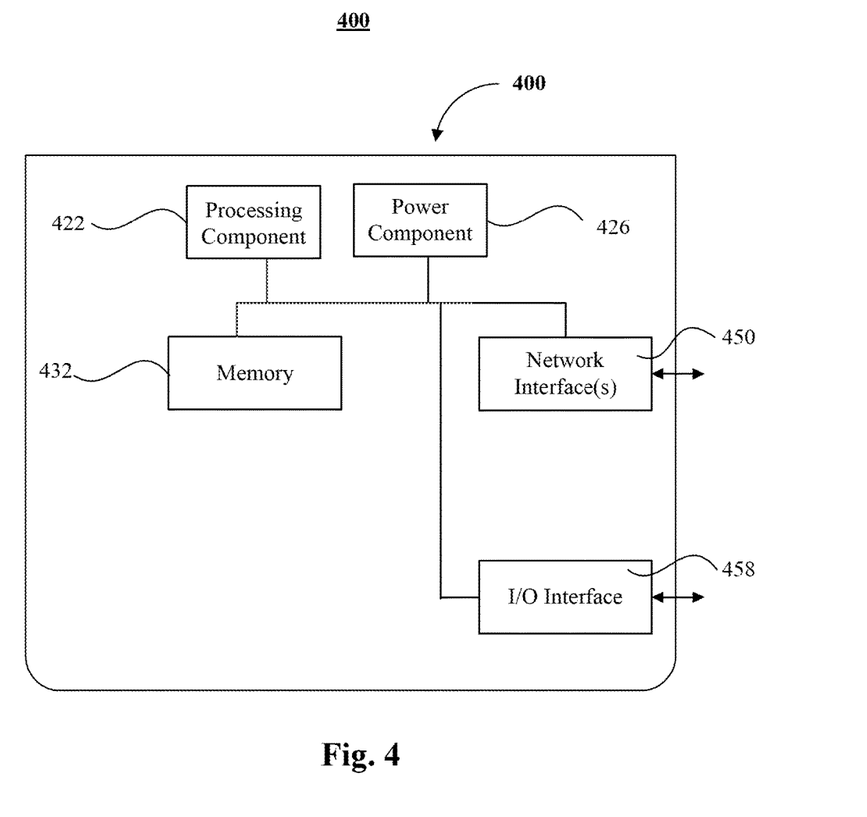
FIG. 4 is a block diagram of a device for reminding a user, according to an exemplary embodiment.

FIG. 4 is a device 400 for reminding a user, according to the forth exemplary embodiment. The device 400 may be provided, for example, as a server. Referring to FIG. 4, the device 400 includes a processing component 422 that further includes one or more processors, and memory resources represented by a memory 432 for storing instructions, such as application programs, executable by the processing component 422. The application programs stored in the memory 432 may include one or more modules, each of them corresponding to a set of instructions. Further, the processing component 422 is configured to execute the instructions to perform the above described methods.

The device 400 may also include a power component 426 configured to perform power management of the device 400, wired or wireless network interface(s) 450 configured to connect the device 400 to a network, and an input/output (I/O) interface 458. The device 400 may operate based on an operating system stored in the memory 432, such as Windows Server™, Mac OS X™, Unix™, Linux™, FreeBSD™, or the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for reminding a user, performed at a server, comprising:
   detecting whether a preset number of terminals in an area have performed a designated operation within a preset time period;
   detecting a terminal in the area that is not one of the terminals having performed the designated operation, if it is detected that the preset number of terminals in the area have performed the designated operation within the preset time period; and
   sending a reminder to the terminal in the area that is not one of the terminals having performed the designated operation, the reminder reminding a user of the terminal to perform the designated operation,
   wherein detecting whether the preset number of terminals in the area have performed the designated operation within the preset time period comprises:
      receiving an operation record of the designated operation provided by each of the terminals in the area having performed the designated operation within the preset time period and saving, in the server, the operation record of the designated operation provided by each of the terminals, the operation record including an operation time of the designated operation and location information of the terminal corresponding to the operation record; and
      detecting, in accordance with the saved operation record of the designated operation provided by each of the terminals, whether the preset number of terminals in the area have performed the designated operation within the preset time period; and
   wherein detecting the terminal in the area that is not one of the terminals having performed the designated operation comprises:
      detecting the terminal that does not report an operation record including the designated operation within the preset time period and has the same location information as at least one of the preset number of terminals detected to have performed the designated operation.

2. The method according to claim 1, further comprising:
   receiving location information provided by the terminal that is not one of the terminals having performed the designated operation, prior to the detecting whether the preset number of terminals in the area have performed the designated operation within the preset time period.

3. The method according to claim 1, wherein the location information of the terminal comprises:
   at least one of an identification of a base station accessed by the terminal, a network identification, or geographic position information of the terminal.

4. The method according to claim 2, wherein the location information of the terminal comprises:
   at least one of an identification of a base station accessed by the terminal, a network identification, or geographic position information of the terminal.

5. A server, comprising:
   a processor; and
   a memory for storing instructions executable by the processor, wherein the processor is configured to:
      detect whether a preset number of terminals in an area have performed a designated operation within a preset time period;
      detect a terminal in the area that is not one of the terminals having performed the designated operation, if it is detected that the preset number of terminals in the area have performed the designated operation within the preset time period; and
      send a reminder to the terminal in the area that is not one of the terminals having performed the designated operation, the reminder reminding a user of the terminal to perform the designated operation,
      wherein, in detecting whether the preset number of terminals in the area have performed the designated operation within the preset time period, the processor is further configured to:
         receive an operation record of the designated operation provided by each of the terminals in the area having performed the designated operation within the preset time period and save the operation record of the designated operation provided by each of the terminals, the operation record including an operation time of the designated operation and location information of the terminal corresponding to the operation record; and
         detect, in accordance with the saved operation record of the designated operation provided by each of the terminals, whether the preset number of terminals in the area have performed the designated operation within the preset time period; and
      wherein, in detecting the terminal in the area that is not one of the terminals having performed the designated operation, the processor is further configured to:
         detect the terminal that does not report an operation record including the designated operation within the preset time period and has the same location information as at least one of the preset number of terminals detected to have performed the designated operation.

6. The server according to claim 5, wherein the processor is further configured to:
   receive location information provided by the terminal that is not one of the terminals having performed the designated operation, prior to the detecting whether the preset number of terminals in the area have performed the designated operation within the preset time period.

7. The server according to claim 5, wherein the location information of the terminal comprises:
   at least one of an identification of a base station accessed by the terminal, a network identification, or geographic position information of the terminal.

8. The server according to claim 6, wherein the location information of the terminal comprises:
   at least one of an identification of a base station accessed by the terminal, a network identification, or geographic position information of the terminal.

9. A non-transitory computer-readable storage medium having stored therein instructions that, when executed by a processor in a server, cause the server to perform a method for reminding a user, the method comprising:
   detecting whether a preset number of terminals in an area have performed a designated operation within a preset time period;
   detecting a terminal in the area that is not one of the terminals having performed the designated operation, if it is detected that the preset number of terminals in the area have performed the designated operation within the preset time period; and sending a reminder to the terminal in the area that is not one of the terminals having performed the designated operation, the reminder reminding a user of the terminal to perform the designated operation, wherein detecting whether the preset number of terminals in the area have performed the designated operation within the preset time period comprises:

receiving an operation record of the designated operation provided by each of the terminals in the area having performed the designated operation within the preset time period and saving, in the server, the operation record of the designated operation provided by each of the terminals, the operation record including an operation time of the designated operation and location information of the terminal corresponding to the operation record; and detecting, in accordance with the saved operation record of the designated operation provided by each of the terminals, whether the preset number of terminals in the area have performed the designated operation within the preset time period; and wherein detecting the terminal in the area that is not one of the terminals having performed the designated operation comprises:

detecting the terminal that does not report an operation record including the designated operation within the preset time period and has the same location information as at least one of the preset number of terminals detected to have performed the designated operation.

\* \* \* \* \*